United States Patent [19]

Robinson

[11] 4,233,771
[45] Nov. 18, 1980

[54] BAIT HOLDER

[76] Inventor: John G. S. Robinson, Box 26, Sooke, British Columbia, Canada, V0S 1N0

[21] Appl. No.: 36,445

[22] Filed: May 7, 1979

[51] Int. Cl.³ ............................................. A01K 83/06
[52] U.S. Cl. ........................................ 43/41; 43/44.4; 43/44.6
[58] Field of Search ................ 43/41, 44.2, 44.4, 44.6, 43/44.8, 41.2

[56] References Cited
U.S. PATENT DOCUMENTS

| | | | |
|---|---|---|---|
| 2,939,241 | 6/1960 | Hicks | 43/44.6 X |
| 2,940,208 | 6/1960 | Oswald | 43/44.6 |
| 2,984,929 | 5/1961 | Kwisnek | 43/44.6 |
| 3,289,346 | 12/1966 | Ehling | 43/44.6 |
| 3,645,031 | 2/1972 | Egles | 43/44.2 |
| 4,067,135 | 1/1978 | Martin | 43/44.2 X |

Primary Examiner—Nicholas P. Godici
Assistant Examiner—Robert P. Olszewski
Attorney, Agent, or Firm—Carver & Company

[57] ABSTRACT

A bait holder for holding minnow-type bait, having a ring within which the head of the bait has a wedged fit, and which is held in position by engagement of a pair of hooks at free ends of a pair of parallel arms extending aft from the ring, the ring having a fore and aft passage through which a leader can be extended and the holder secured against movement on the leader by engagement of a friction blocking device on one of the arms with the leader.

4 Claims, 5 Drawing Figures

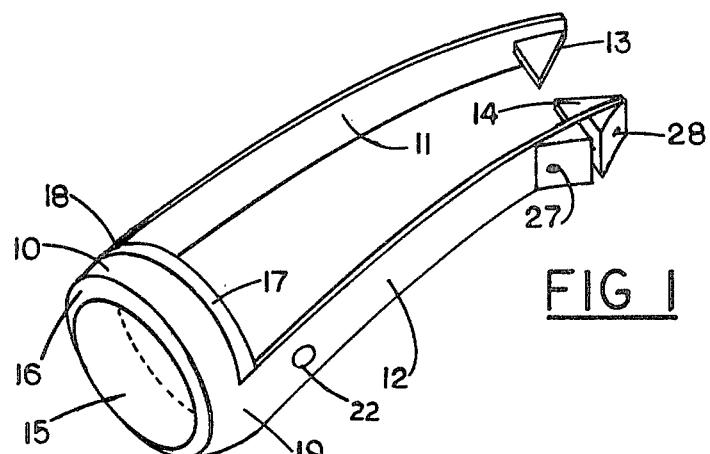
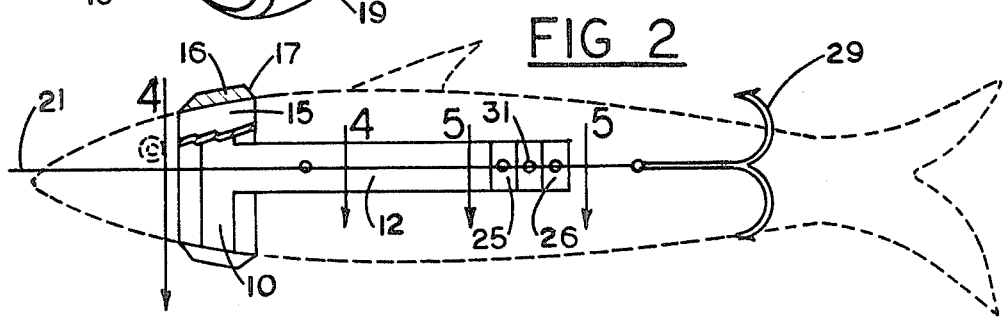
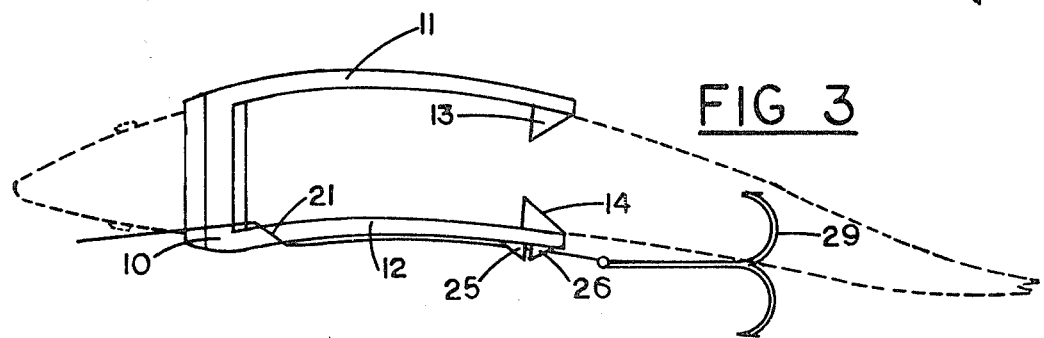
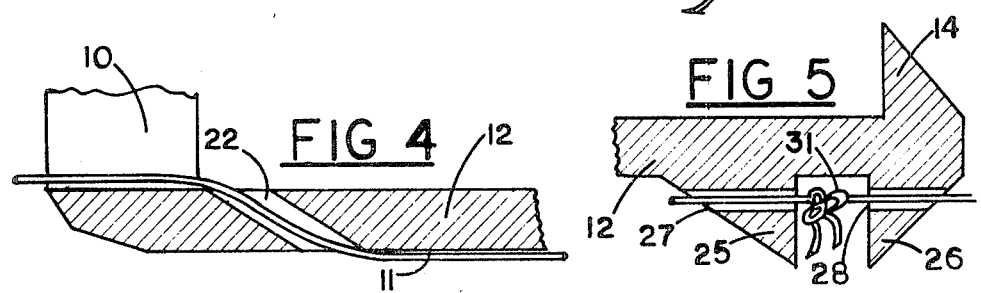

BAIT HOLDER

BACKGROUND OF THE INVENTION

1. Field of the Invention

This invention relates generally to fishing lures and more particularly to bait holding devices which can be secured to a fishing line.

2. Prior Art

In the use of lures for catching game fish, notably salmon, it is important that the lure should have the appearance of and act like food fish normally taken by the salmon. In trolling for salmon, it has been normal practice to fix a small minnow or herring on a hook and to troll it behind a boat. The motion of a bait thus displayed does not resemble movements of a bait fish which has been stunned or otherwise injured by a salmon. Consequently, a number of holders have been developed to hold the bait securely and, at the same time, impart to the bait fish an action calculated to attract the salmon.

Some of these holders require the use of wooden splints, or the like, which are extended through openings in the holder and pierce the bait fish, and normally cover a portion of a bait fish so that the bait fish does not resemble bait swimming freely in the water. Prior art holders also tend not to hold the bait fish securely and thus make it necessary for the fisherman to be constantly taking in his line to assure himself that he still has his bait.

SUMMARY OF THE INVENTION

The present invention provides a holder for bait fish which is very inexpensive to produce, has good holding powers, exposes substantially all of the bait fish and, imparts an action to the bait fish, when trolled, which emulates a wounded or damaged herring in a manner most attractive to a game fish.

The holder of the present invention comprises a ring adapted to wedgedly receive the head of the bait fish, a pair of arms rigidly secured to the ring and extending aft in parallelism along opposite sides of and grasping the body of the bait fish, hook elements at the free ends of the arms engageable with the body of the bait fish to prevent withdrawal of the head from the ring, and means on at least one of the arms for securing the holder to a fishing leader.

A detailed description following, related to drawings, gives exemplification of apparatus according to the invention which, however, is capable of expression in means other than those particularly described and illustrated.

DESCRIPTION OF THE DRAWINGS

FIG. 1 is a perspective view of the bait holder of the invention,

FIG. 2 is an elevation of the holder holding a bait fish, the latter being shown in broken outline, FIG. 3 is a plan view of the holder and fish shown in FIG. 2, FIG. 4 is an enlarged sectional view, taken on Line 4—4, of FIG. 2, FIG. 5 is an enlarged sectional view, taken on Line 5—5, of FIG. 2.

DETAILED DESCRIPTION

Referring to the drawings, the bait holder has a forward ring 10 from which trail, in diametrically opposed opposition, a pair of elongated arms 11 and 12 at free ends of which inwardly project a pair of hooks 13 and 14. The ring 10, see particularly FIGS. 1 and 2, has a forwardly tapering frustoconical interior surface 15 and the forward and aft edges are bevelled at 16 and 17 to provide it with a streamline characteristic.

The arms 11 and 12 are rigidly connected at their forward ends 18 and 19 to the ring, and extend rearwardly on opposite sides therefrom in parallelism. The arms, as shown in FIGS. 1 and 3, although extending from the ring in parallelism, are bowed laterally with the inwardly extending hooks 13 and 14 almost touching each other. The holder also has means for enabling it to be secured to a leader 21. These means, see FIG. 4, include an inclined passage 22 through arm 12 through which the leader can be threaded. These means also include a pair of spaced blocks 25 and 26 at aft ends of the arm 12 which have fore and aft extending aligned passages 27 and 28, as shown in FIG. 5. These passages, 27 and 28, like passage 22 are sufficiently large enough to enable the leader to be threaded through. The holder, including the ring, arms and hooks, is preferably of integral construction and formed of a springy thermoplastic material which can in some instances be of a transparent nature or can be of a suitable colour depending upon the nature and the characteristics of the bait fish, and also depending on the nature of the fish to be caught. Dimensions of the holder is, of course, related to the size and characteristic of the bait fish.

In use, the leader 21 is first extended through the ring 10, then threaded through the passage 22 and is then threaded through the passages 27 and 28 in the blocks 25 and 26. A suitable fish hook 29 is then fastened on the end of the leader and a thread 31, or the like, is then wrapped around the leader between the blocks 25 and 26 and knotted so as to provide a detent which is a little larger than the passages 27 and 28 so as to limit fore and aft movement of the holder on the leader. A bait fish, which can be a small herring or anchovy, is then forced head first into the ring, and the free ends of the arms are then pinched together to drive the hooks into the body of the bait fish and thus prevent withdrawl of the head of the bait fish from the ring.

The particular size and shape of the holder, as pointed out previously, is related to the type of bait fish to be used. In keeping with the aims of the invention the inside diameter of the ring is such that a wedge fit is obtained with the head of the bait fish when the ring covers the gill plates and with the eye just clear of the ring. The body of the bait fish, extending aft of the ring, is thus wider than the diameter of the ring taken through the fish, consequently the arms will tend to be sprung outwardly from their normal parallel position and thus have a clamping effect along the body of the bait fish between the gills and to a point just aft of its dorsal fin. Thus when the free ends of the arms are pinched together to drive the hooks into the bait fish body the arms which are curved laterally impart, as shown in FIG. 3, lateral curvature to that portion of the body of the fish along which the arms extend.

Referring to FIG. 3, the leader, it is seen is offset relative to the fore and aft axis of the bait fish and with a combination of such offset and the curvature of the bait fish the latter, when drawn through the water, performs a rolling and a side to side action which greatly resembles the movement of a live small fish when it has been injured such as in a first attack by a game fish. This condition, as is well known, entices any game fish to strike.

The use of the holder, it is apparent, extends the useful life of the bait due to the fact that the gills and mouth are maintained in a closed position so as to reduce drag and thus reduce rapid deterioration of the bait.

I claim:

1. A holder for holding minnow-type bait comprising:
   (a) a ring within which the head of the bait fish is adapted to have a wedged fit so as to expose a portion of the head extending forwardly from near the eyes of the fish,
   (b) a pair of elongated arms extending in substantial parallelism from the ring normally in engagement along opposite sides of the body of the bait fish,
   (c) hook means at the ends of the arms for piercing the body of the bait fish for maintaining the head of the fish within the ring,
   (d) means on at least one of the arms for securing the holder to a fishing line, said means for securing including a passage extending laterally through one of the arms adjacent the ring through which the fishing line can be threaded after passing through the ring and passage means near the trailing end of said one arm though which the fishing line can then be threaded for maintaining said one arm in substantial parallelism with the line, so the line is offset relative to the fore and aft axis of the bait fish and the bait fish moves in a rolling and side to side action when the holder is pulled through the water.

2. A holder as claimed in claim 1 in which the arms are bowed laterally for imparting a bowed aspect to that portion of the body of the fish between the ring and the hooks.

3. A holder as claimed in claim 1 in which the last mentioned passage means includes a pair of longitudinally spaced-apart blocks at said free end of said one arm, the blocks having alighed passages through which the line can be threaded so as to expose a section of line between the blocks.

4. A holder as claimed in claim 1 in which the ring, arm and hooks are of integral construction and are formed of a springy thermo-plastic material.

* * * * *